(12) United States Patent
Zhao et al.

(10) Patent No.: US 10,111,279 B2
(45) Date of Patent: Oct. 23, 2018

(54) CONVERGED COMMUNICATIONS DEVICE AND METHOD OF CONTROLLING THE SAME

(71) Applicant: MOTOROLA SOLUTIONS, INC., Chicago, IL (US)

(72) Inventors: Dong Zhao, Sichuan (CN); Wei Chu, Sichuan (CN); Antonio Faraone, Fort Lauderdale, FL (US); Qingxiao Zheng, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/323,933

(22) PCT Filed: Sep. 21, 2015

(86) PCT No.: PCT/CN2015/090179
§ 371 (c)(1),
(2) Date: Jan. 4, 2017

(87) PCT Pub. No.: WO2017/049441
PCT Pub. Date: Mar. 30, 2017

(65) Prior Publication Data
US 2017/0302775 A1    Oct. 19, 2017

(51) Int. Cl.
*H04W 88/06* (2009.01)
*H04M 1/60* (2006.01)
(Continued)

(52) U.S. Cl.
CPC ............ *H04W 88/06* (2013.01); *H04L 5/16* (2013.01); *H04M 1/605* (2013.01);
(Continued)

(58) Field of Classification Search
CPC ...................................................... H04M 1/605
(Continued)

(56) References Cited

U.S. PATENT DOCUMENTS 8,620,291 B2  12/2013  Locker et al.
8,923,835 B2  12/2014  Levien et al.
(Continued)

FOREIGN PATENT DOCUMENTS

CN    102316188    1/2012
CN    103780765    5/2014
(Continued)

OTHER PUBLICATIONS

PCT/CN2015/090179 International Search Report and Written Opinion of the International Searching Authority dated Jun. 17, 2016 (11 pages).

*Primary Examiner* — Simon Nguyen
(74) *Attorney, Agent, or Firm* — Michael Best & Friedrich LLP

(57) ABSTRACT

A method of controlling a converged communications device. The method includes executing a first call between the converged communications device and a first network using a first communication modality, audibilizing the first call with one of an earpiece speaker and a loudspeaker, receiving a second call from a second network having a second communication modality different from the first communication modality, sensing an action by a user in response to receiving the second call, and audibilizing the second call with the other of the earpiece speaker and the loudspeaker based on the action and based on the second communication modality. Also discloses is a converged communications device performing the method.

21 Claims, 7 Drawing Sheets

(51) Int. Cl.
  *H04L 5/16* (2006.01)
  *H04M 1/725* (2006.01)
  *H04R 3/12* (2006.01)
  *H04W 68/00* (2009.01)
  *H04W 76/16* (2018.01)
  *H04W 84/04* (2009.01)

(52) U.S. Cl.
  CPC ....... *H04M 1/6016* (2013.01); *H04M 1/7253* (2013.01); *H04M 1/72569* (2013.01); *H04R 3/12* (2013.01); *H04W 68/005* (2013.01); *H04M 2250/52* (2013.01); *H04W 76/16* (2018.02); *H04W 84/042* (2013.01)

(58) Field of Classification Search
  USPC ............................................ 455/552.1, 569.1
  See application file for complete search history.

(56) References Cited

U.S. PATENT DOCUMENTS

| | | | |
|---|---|---|---|
| 2002/0068537 A1 | 6/2002 | Shim et al. | |
| 2007/0298827 A1* | 12/2007 | Hansson | H04M 1/0285 455/550.1 |
| 2008/0101589 A1* | 5/2008 | Horowitz | H04M 1/035 379/388.03 |
| 2009/0029745 A1* | 1/2009 | Eaton | H04M 1/0216 455/575.1 |
| 2012/0182429 A1* | 7/2012 | Forutanpour | H04R 3/005 348/175 |
| 2013/0078966 A1* | 3/2013 | Chang | H04W 76/02 455/414.1 |
| 2013/0222514 A1* | 8/2013 | Liu | H04M 1/605 348/14.01 |
| 2013/0260834 A1 | 10/2013 | Ingalls | |
| 2013/0316687 A1* | 11/2013 | Subbaramoo | H04M 1/605 455/418 |
| 2013/0332156 A1* | 12/2013 | Tackin | H04M 1/6041 704/226 |
| 2014/0241540 A1* | 8/2014 | Hodges | H04M 1/6066 381/74 |
| 2016/0004304 A1* | 1/2016 | Kim | G06F 3/013 345/649 |
| 2016/0248894 A1* | 8/2016 | Hosoi | H04M 1/03 |
| 2017/0055110 A1* | 2/2017 | Tian | G04G 21/04 |
| 2017/0179988 A1* | 6/2017 | Caballero | H04B 1/385 |

FOREIGN PATENT DOCUMENTS

| | | |
|---|---|---|
| CN | 104765446 | 7/2015 |
| WO | 2014172109 | 10/2014 |

\* cited by examiner

CONVERGED COMMUNICATIONS DEVICE AND METHOD OF CONTROLLING THE SAME

BACKGROUND OF THE INVENTION

A converged communications device incorporates components (e.g., hardware and software) to permit communications via two or more modalities. For example, a converged communications device may incorporate components to support communications via a land mobile radio (LMR) network and a commercial long term evolution (LTE) network. While converged devices provide a number of benefits in comparison to single-modality devices, issues may arise when communications are migrated, or the user chooses to switch, from a first modality to a second modality.

Accordingly, there is a need for an electronic device, for example a converged communications device, having means for managing migration from, or the selection between, a first communications modality to a second communications modality. Also, there is a seed for a method for controlling the electronic device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
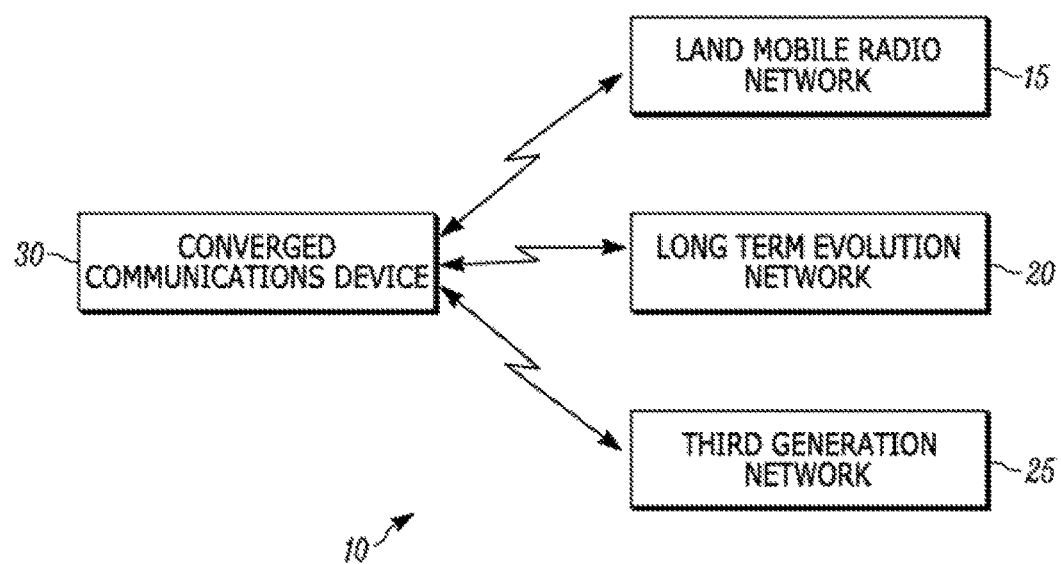
FIG. 1 is a block diagram illustrating a multiple network system interacting with a converged wireless communication device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiment of the present invention.

The apparatus and method components have been represented where appropriate by conventional symbols in the drawings, illustrating only those specific details that are pertinent to understanding the embodiments of the invention so as not to obscure the disclosure with details that will be readily apparent to those of ordinary skill in the art having the benefit of the description herein.

DETAILED DESCRIPTION OF THE INVENTION

One embodiment provides a method of controlling a converged communications device having a first speaker and a second speaker. The method includes executing a first communication between the converged communications device and a first network using a first communication modality. The first communication modality is selected from the group consisting of a land mobile ratio modality and a non-land mobile ratio modality. The method further includes audibilizing the first communication with the first speaker, and receiving a second communication from a second network having a second communication modality different than the first communication modality. The second communication modality is selected from the group consisting of a land mobile radio modality and a non-land mobile radio modality. The method includes sensing an action on the converged communication device in response to receiving the second communication, and audibilizing the second communication with the second speaker based on the action and based on the second communication modality. The action may encompass multiple actions.

The first speaker may be a speaker selected from the group consisting of an earpiece speaker and a loudspeaker and the second speaker is the other of the earpiece speaker and the loud speaker.

The method may include buffering a portion of the second communication upon receiving the second communication and before audibilizing the second communication. The method may also include generating an alert in response to receiving the second communication, and the sensing the action may be in further response to generating the alert.

In some embodiments, the first communication modality is a non-land mobile radio modality and the audibilizing the first communication is with an earpiece speaker. Also, the second communication modality is a land mobile radio modality and the audibilizing the second communication is with a loudspeaker.

In some embodiments, the land mobile radio modality includes a half-duplex voice communication, and the non-land mobile radio modality includes a full-duplex voice communication.

In further embodiments, the land mobile radio modality includes a first defined frequency range, and the non-land mobile radio modality includes a second defined frequency range different from the first defined frequency range.

In some embodiments, the land mobile radio modality is communicated over a first communication network, and the non-land mobile radio modality is communicated over a second communications network different from the first communications network.

In further embodiment, sensing the action includes one or more of detecting a defined movement of the converged communications device by a gyroscope, detecting a defined movement of the converged communications device by an accelerometer, detecting an object near the converged communications device by a proximity sensor, and detecting a facial feature near the convened communications device with a camera.

In further embodiments, the method includes communicating data between the converged communications device and the first network using the first communication modality while executing the first communication between the converged communications device and the first network, and ceasing the communicating data between the converged communications device and the first network based on the action. The method may also include determining whether the second network supports communicating the data, and communicating the data between the converged communications device when the second network supports communicating the data. Alternatively, the method may also include determining whether the second network supports communicating the data, and queuing the data when the second network does not support communicating the data.

In yet further embodiments, the method includes suspending the first communication between the converged communications device and the first network based on the action, and buffering the first communication.

In some embodiments, a converged communications device includes a first speaker, a second speaker, a first communications interface configured to communicate with a first network using a first communication modality, a second communications interface configured to communicate with a second network using a second communication modality different from the first communication modality, and a processor coupled to the first speaker, the second, the first communications interface, and the second communications interface. The first and second communication modalities are selected from the group consisting of a land mobile radio modality and a non-land mobile radio modality. The processor is programmed to execute a first communication between the converged communications device and the first network using the first communication modality, cause one of the first speaker and the second speaker to audibilize the first communication based on the first communication modality, identify a second communication from the second network and having the second communication modality, determine an action on the converged communications device in response to receiving the second communication, and cause the other of the first speaker and the second speaker to audibilize the second communication based on the action and based on the second communication modality.

The converged communications device may include one or more of a gyroscope, and accelerometer, a camera for detection a facial feature, and a proximity sensor. The convened communications device may further include a user interface for alerting the user of the second communication.

FIG. 1 illustrates a block diagram of a multiple network system 10. In the example illustrated, the multiple network system 10 includes a land mobile radio (LMR) network 15, a long term evolution (LTE) network 20, and a third generation (3G) of mobile telecommunications technology network 25. The provided networks are exemplary—other networks, including future developed networks may be employed in the multiple network system 10. Further, all three disclosed networks need not be present and/or more than three networks may be present. Also, one skilled in the art would understand that the networks are more complex than the schematic illustration provided in FIG. 1.

A converged communications device 30 communicates with the networks 15, 20, and 25. An exemplary converged communications device 30 may be a cellular telephone/2-way radio combination that may communicate with the networks 15, 20, and 35 where for instance the 2-way communication mod is executed with the land mobile radio network 15 and the cellular telephone communication mode is executed with the long term evolution network 20.

Figure 2:
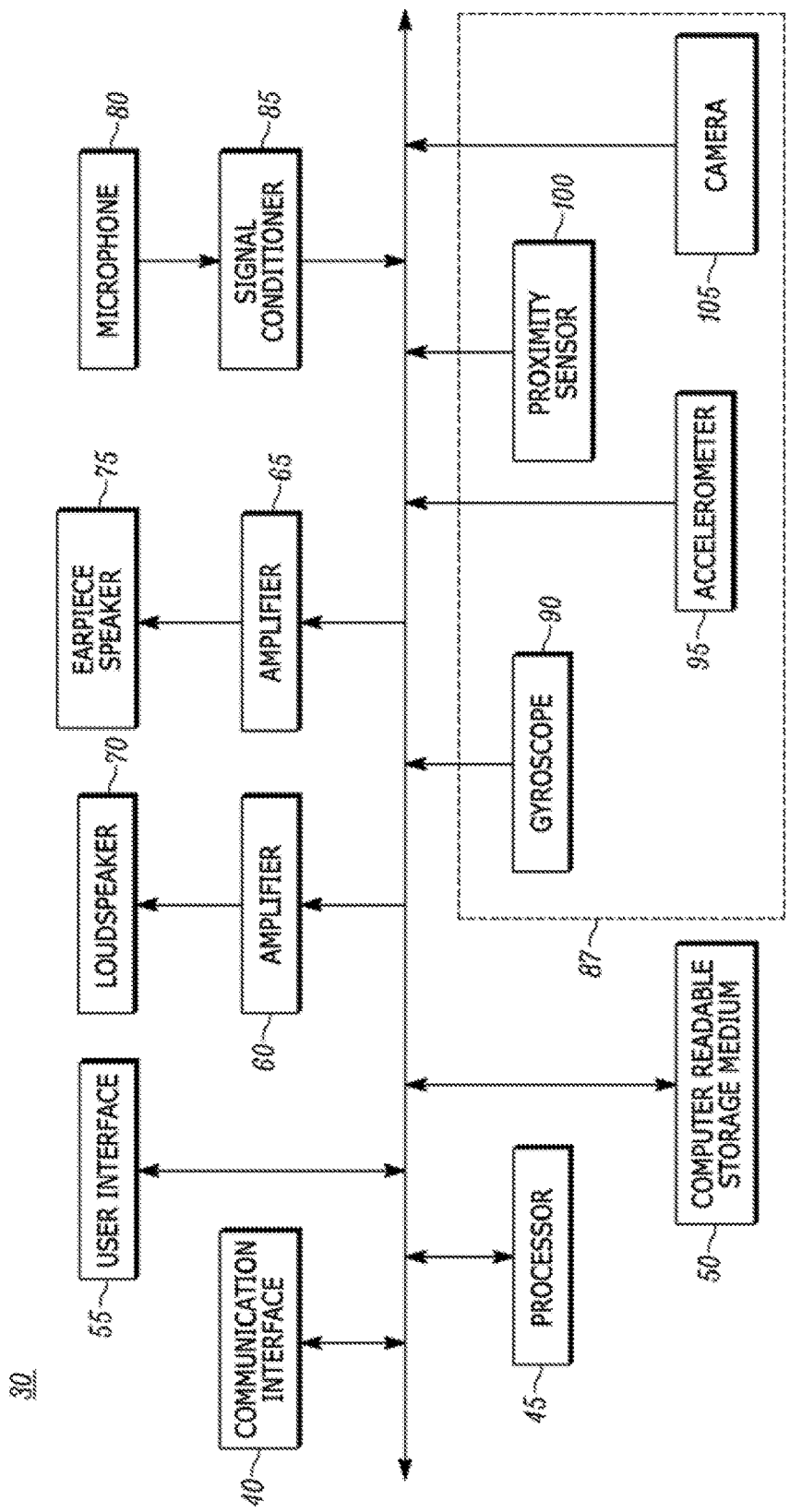
FIG. 2 is a block diagram illustrating the converged communications device capable of being used in the multiple network system of FIG. 1.

A detailed block diagram for an exemplary converged communications device 30 is illustrated in FIG. 2. The converged communications device 30 includes, among other components, a communications interface 40, a processor 45, a computer-readable storage medium 50, and a user interface 55. The communications interface 40, which may encompass multiple communications interfaces, includes the necessary hardware (e.g., chipsets, antennas, Ethernet, cards, etc.), firmware, and software for conducting communications with the networks 15, 20, and 25. The communications with the networks 15, 20, and 25 may be one or more of voice, visual, and data communications. Each communications interface 40 may include distinct hardware, firmware, and software, or may combine hardware, firmware, and software to allow a reduction in redundancies.

The user interface 55, which may also encompass multiple user interfaces, includes the necessary hardware (e.g., chipset, display, input device, etc.), firmware, and software for receiving user inputs and providing user notifications by the converged communications device 30. The user interface 55 may also be configured to display conditions or data associated with applications that are executed on the converged communications device 30 in real-time or substantially real-time.

FIG. 2 also illustrates amplifiers 60 and 65, a loudspeaker 70, an earpiece speaker 75, a microphone 80, and a signal conditioner 85. The amplifier 60 and the loudspeaker 70 audibilize sounds so that the user of the converged communications device 30 may hear the sound at a distance substantially away from the converged communications device 30. To audibilize sounds is to mean that the sounds are heard or are able to be heard. The converged communications device 30 is substantially away from an object (e.g., the user's head) when the converged communications device is disposed between approximately 2.5 centimeters and 50 centimeters or more from the object. The amplifier 65 and the earpiece speaker 75 audibilize sounds so that the user of the converged communications device 30 may hear the sound when the user's ear is substantially near the earpiece speaker 75. For example, the converged communications device 30 is substantially near an object (e.g., the user's ear) when the converged communications device is disposed less than approximately 2.5 centimeters from the object.

Figure 4:
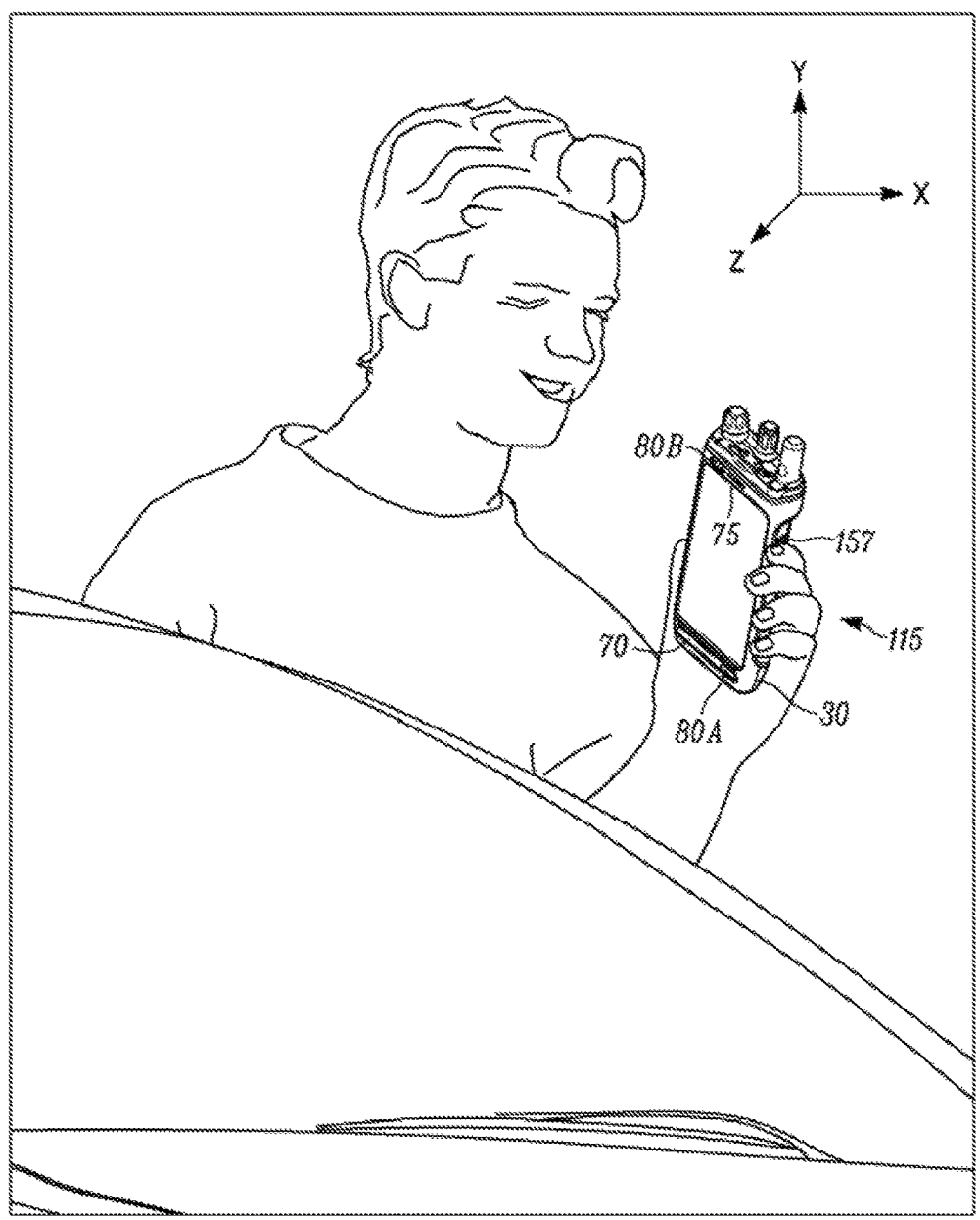
FIG. 4 is a perspective view of the user holding the converged communications device of FIG. 2 in a second position.

The microphone 80 and the signal conditioner 85 receive sound (e.g., from the user) and convert the sound into an electrical signal appropriate for processing by the converged communications device 30. The microphone 80 may encompass multiple microphones (80A and 80B are shown in FIG. 4), including a first microphone (80B in FIG. 4) typically used for land mobile radio communication and a second microphone (80A in FIG. 4) typically used for cellphone-like communication. One skilled in the art would understand that white separately illustrated, the amplifiers 60 and 65, loudspeaker 70, earpiece speaker 75, microphone 80, and signal conditioner 85 are additional examples of user interfaces.

The converged communications device 30 also includes a sensor suite or set 87. The sensor suite includes sensors for sensing actions on the converged communications device e.g., by the user. Example sensors include a gyroscope 90, an accelerometer 95, a proximity sensor 100, and a camera 105. The camera 105 is typically located on a front face of the converged communications device 30, but may be located on other faces of the converged communications device 30. Each sensor may include the necessary hardware, firmware, and software for interacting with and receiving a signal from the sensor. Alternatively, the hardware, firmware, and software of the sensors may be distinct from the sensor or combined with other elements (e.g., the processor 45 and the computer-readable storage medium 50) of the converged communications device 30.

The gyroscope 90 and the accelerometer 95 are example motion sensors. The gyroscope 90 senses the rate of rotation around three axes (for example, x, y, and z axes). The accelerometer 95 senses changes in velocity over time along one or multiple linear path. The accelerometer typically includes three accelerometers, one for each x, y, and z axes. When combined, the three accelerometers sense movement in any direction. Other motion sensors may be included with the converged communications device 30, such as a gravity sensor and a rotational vector sensor. Also position sensors, such as orientation sensors and magnetometers, may supplement the motion sensors.

The proximity sensor 100 senses the proximity of an object, e.g., estimating the distance in millimeters, relative to a portion of the converged communications device 30. For example, the proximity sensor may be used to determine whether the converged communications device 30 is located near the user's head.

The camera 105, used with face detection software, may be used for face detection and detection of face features. One skilled in the art would understand, however, that the camera 105 may be used for capturing pictures or acquiring video.

In a converged communications device 30, an example scenario involves the converged communications device 30 transitioning between a communication over the long term evolution network 20 to a communication over the land mobile radio network 15 and back. The long-term evolution network 20 may be, for example, a commercial mobile radio service (CMRS) network and the communication may be a full-duplex voice communication. In this scenario, the converged communications device 30 is conventionally held near a user's ear (see FIG. 3) thereby facilitating use of the earpiece speaker 75 during the full-duplex voice communication. Alternatively, the land mobile radio network 15 may be, for example, a public safety network or direct mode network and the communication may be a half-duplex voice communication. In this scenario, the converged communications device 30 is conventionally positioned in front of the user's face (see FIG. 4). When performing the half-duplex voice communication, the converged communications device 30 typically employs the loudspeaker 70 because it provides audible speech at significant distance from the converged communication device 30 even in loud or noisy environments. It will be appreciated that this example scenario described herein is one of many possible scenarios for the converged communications device 30. That is, while conventional positions are described above and illustrated in FIGS. 3 and 4, other positions and placements of the converged communications device 30 may occur. Also, other communication modalities may have other conventional placements. Moreover, different speakers and microphone configurations may result in different positions and placements of the converged communications device 30.

Difficulties may arise when the converged communications device 30 is engaged in a communication of the first modality and a communication of the second modality is received. For example, when the converged communications device 30 is engaged in a full-duplex voice communication, the converged communications device 30 device may be located in a first position 110 (FIG. 3) that places the converged communications device 30 near the user's ear. If a half-duplex voice communication is received during the full-duplex voice communication, handling the half-duplex voice communication may be inconvenient for the user as a result of the converged communications device 30 being positioned near the user's ear. Conversely, if the converged communications device 30 is engaged in a half-duplex voice communication and located in a second position 115 (FIG. 4), e.g., the converged communications device 30 is in front of the user's face, the user may find handing a full-duplex voice communication difficult because the converged communications device 30 is away from the user's ear. To reduce these potential difficulties, embodiments of the converged communications device 30 monitor sensor inputs of the converged communications device 30 in response to a notification by the converged communications device 30. The converged communications device 30 may make operation decisions using the sensor inputs. The sensor inputs are indicative of the user's communication preference.

Figure 5:
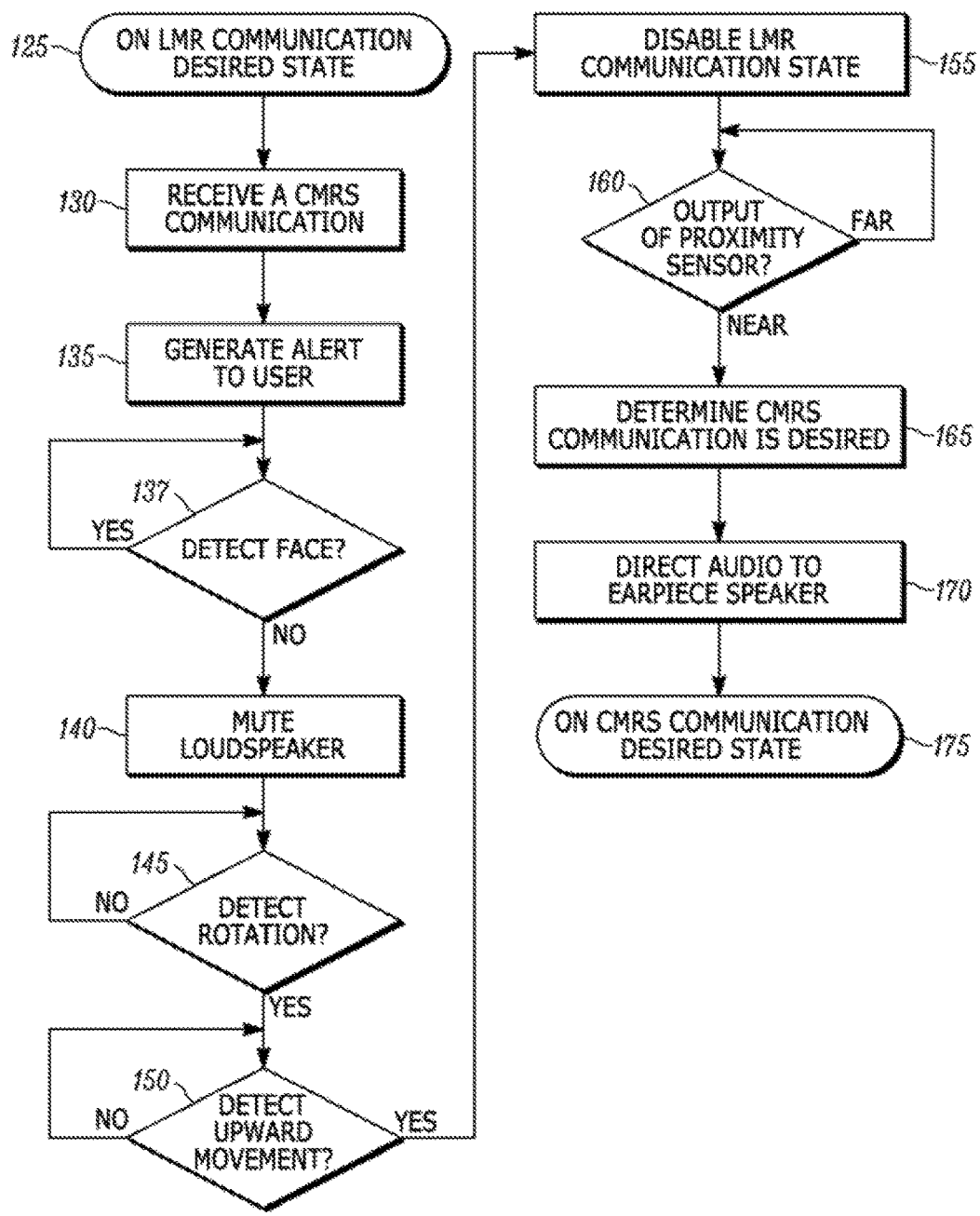
FIG. 5 is a flowchart illustrating the converged communications device of FIG. 2 transitioning from a first communication state to a second communication state.

FIG. 5 provides a procedure, according to an embodiment of the converged communications device 30 when the converged communications device 30 is in a first communication state and transitions to a second communication state. The first and second communication states employ at least voice communication. While the procedure is illustrated in a linear fashion, various actions may be performed out of order and/or performed concurrently. Also, one skilled in the art would understand that not all of the actions illustrated and described are required in all operations and that additional actions may be performed without being illustrated or described with a land mobile radio communication.

At block 125, the converged communications device 30 is in a land mobile radio communication state and a land mobile radio communication may be executed using a first communication modality with the land mobile radio network 15. The first communication modality may use, for example, a first regulated frequency band and/or half-duplex voice communication. Also, the converged communications device 30 typically is conventionally positioned in front of the user's face during the land mobile radio communication.

At block 130, the converged communications device 30 receives a second communication. The second communications may be in a second communication modality with a second network, such as the long term evolution network 20. For example, the long term evolution network 20 may be a commercial mobile radio services network, and the communication may be a commercial mobile radio services communication. The second communication modality, under this scenario, may use a second regulated frequency band and/or full-duplex voice communication.

At block 135, the converged communications device 30 generates a notification alert. The notification alert may be, for example, a visual, audible, haptic alert, or combination thereof.

Before continuing, various actions discussed herein are described as the converged communications device 30 performing the action. However, one skilled in the art would understand that components of the converged communications device 30 perform operations resulting in the action. For example, when referencing the converged communications device 30 generating an alert, in the previous paragraph, the processor 45 executes software stored in the computer readable storage medium 50 to generate an electrical signal. The generated electrical signal is provided to the user interface 55. The user interface 55 then generates the alert in response to the received electrical signal from the processor 45. Other actions within FIGS. 5 and 6 would similarly be understood by one skilled in the art as involving more detailed, but well understood operations.

Figure 3:
FIG. 3 is a perspective view of a user holding the converged communications device of FIG. 2 in a first position.

In response to the alert, the user may elect to start a transition of the converged communications device 30 from the second position 115 (illustrated in FIG. 4) to the first position 120 (illustrated in FIG. 3). For example, the user may transition the converged communications device 30 from being generally in front of the user's face to generally holding the earpiece speaker 75 near the user's ear. During the transition, one or more of the sensors may monitor for the transition.

For example, at block 137, the camera may be used to detect the user's face, including one or more facial features of the user. When detected, then the converged communications device 30 determines the user is not going to transition the converged communications device 30 from the first position to the second position. When the user's face is not detected, then the process proceeds to block 140.

While performing the loop of block 137, the procedure includes a predefined time period for which to monitor for the action. Once the predefined time period has elapsed, the procedure may perform actions not illustrated in FIG. 5 and return to block 125. For example, one action may be the converged communications device 30 transitioning the second communication to a voicemail state for recording.

Returning to FIG. 5, the converged communications device 30 mutes the loudspeaker 10 at block 140. Also, the converged communication device 30 may start buffering the speech received from the land mobile radio communication, which is now muted, for instance transitioning the communication to a voicemail state for recording. At block 145, the converged communications device 30 detects, with the gyroscope 90, whether the converged communications device 30 is rotating, and at block 150, the converged communications device 30 detects, with the accelerometer 95, whether movement is in an upward direction (or Y-direction). If the answer for both of these questions is yes, then the operation proceeds to block 155. Otherwise, the converged communications device 30 continues to monitor for these actions. Similar to block 137, the converged communications device 30 may monitor for these actions for a predefined time period. If the predefined time period elapses, the procedure returns to block 125.

At block 155, the converged communications device 30 suspends the land mobile radio communication state. In this suspended state, the land mobile radio communication is interrupted and the received communication may be buffered. This occurs even if a push-to-talk button 157 (FIG. 4), normally used in the land mobile radio communication, is depressed. Furthermore, a special tone or equivalent signal may be sent by the converged communications device 30 just before halting the land mobile radio communication. The tone may be communicated to the other parties in the land mobile radio communication to alert the parties that the user of converged communications device 30 elected to attend a different call. The converged communications device 30 then monitors whether the device 30 has been placed near the head of the user. The monitoring is performed with the proximity sensor 100 (block 160). If the proximity sensor detects an object (e.g., the side of the users face), then the procedure proceeds to block 165. Otherwise, the procedure loops through block 160 for a predefined time period.

At block 165, the converged communications device 30 determines that the second communication is preferred over the first communication. The determination is based on the type and sequence of action sensed by the converged communications device and based on the sensed information resulting from those actions. When face features are lost by the camera 105, rotation is sensed by the gyroscope 90, upward movement is detected by the accelerometer 95, and near proximity is detected by the proximity sensor 100, then the converged communications device 30 concludes that the commercial long term evolution or full-duplex voice communication is preferred over the land mobile radio or half-duplex voice communication. The audio from the second communication is directed to the earpiece speaker and the second communication begins (blocks 170 and 175).

FIG. 5 illustrates the converged communications device 30 transitioning from a first communication state to a second communication state. However, other sequences in which detected actions are assigned different priorities are possible. For example, the output of the proximity sensor 100 may take priority over the other sensors. Before such a priority is implemented, the converged communications device 30 mutes the loudspeaker 70 when the proximity sensor detects an object. It is also envisioned that other movements may be monitored by the converged communications device 30. In addition, it is envisioned that the user may use the user interface 55 throughout the procedure to manually control the converged communications device 30. When this occurs, then an interrupt is triggered and the state of the converged communications device 30 changes to a manual state.

Figure 6:
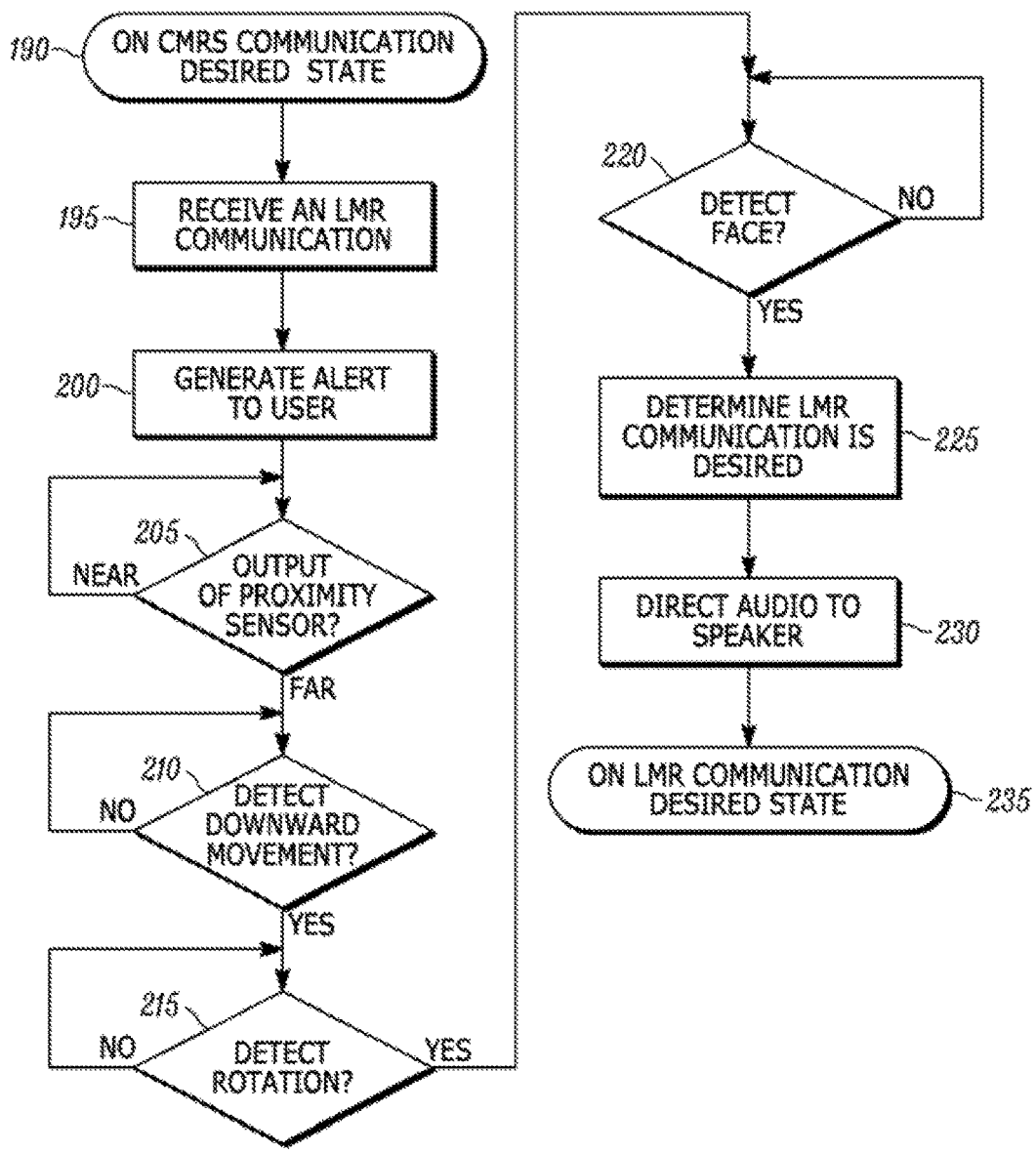
FIG. 6 is a flowchart illustrating the converged communications device of FIG. 2 transitioning from the second communication state to the first communication state.

FIG. 6 provides an operation procedure, according to one embodiment, of the converged communications device 30 when the converged communications device 30 is in the second communication state and transitions to the first communication state. While the procedure is illustrated in a linear fashion, various actions may be performed out of order and/or performed concurrently. Also, one skilled in the art would understand that not all of the actions illustrated and described are required in all operations and that additional actions may be performed without being illustrated or described herein.

At block 190, a commercial mobile radio services (CMRS) communication is received and the converged communications device 30 is in a commercial mobile radio service communication state. A commercial mobile radio services communication is in a second communication modality with the long term evolution network 20, for example. The second communication modality may be a second regulated, frequency band and/or use full-duplex voice communication. Also, the user typically holds the converged communications device 30 at the side of the user's face with a commercial mobile radio services communication.

At block 195, the converged communications device 30 receives a second communication, which may be a land mobile radio communication. The second communication may be in a first communication modality with a first network, such as the land mobile radio network 15. The first communication modality, under this scenario, may be a first regulated frequency band and/or use half-duplex voice communication.

At block 200, the converged communications device 30 generates an alert. The alert may be a visual, audible, or haptic alert. In addition, the converged communications device 30 may start buffering a portion of the second communication.

In response to the alert the user may elect to start a transition of the converged communications device 30 from the first position 119 to the second position 115. For example, the user may transition the converged communications device 30 from being near the user's ear to generally in front of the user's face. During the transition, one or more of the sensors may monitor for the transition.

For example, at block 205, the converged communications device 30 monitors whether the device 30 is near an object. The monitoring may be performed with the proximity sensor 100. When the proximity sensor detects an increased distance from an object (e.g., the side of the user's head), then the procedure proceeds to block 210. Otherwise, the procedure may loop through block 205.

While performing the loop of block 205, the converged communications device 30 may continue to buffer a portion of the second communication. Also, the procedure includes a predefined time period for which to monitor for the action. Once the predefined time period has elapsed, the procedure may perform actions not illustrated in FIG. 4 and return to block 190. For example, the converged communications device 30 may move the second communication to a voice-mail state for recording.

At block 210, the converged communications device 30 detects, with the accelerometer 95, whether there is movement in a downward direction. At block 215, the converged communications device 30 detects with the gyroscope 90, whether the converged communications device 30 is rotating. At block 220, the camera attempts to detect the user's face, including one or more facial features of the user. When each of these phenomena is detected in the predetermined sequence illustrated in FIG. 6, then the operation proceeds to block 225. Otherwise, the converged communications device 30 continues to monitor for these actions. Similar to block 205, the converged communications device 30 may monitor for these actions for a predefined time period. When the time period elapses, the procedure returns to block 190.

At block 225, the converged communications device 30 determines that the second communication is preferred over the first communication. The determination is based on the type and sequence of actions sensed by the converged communication device and based on information resulting from those actions. When near proximity is lost by the proximity sensor 100, rotation is sensed by the gyroscope 90, downward movement is detected by the accelerometer 95, and face features are obtained by the camera 105, then the converged communications device 30 concludes that the land mobile radio or half-duplex voice communication is preferred over the commercial mobile radio service or full-duplex voice communication (block 225). The buffered audio is directed to the loudspeaker 70 and the second communication begins (blocks 230 and 235).

FIG. 6 provides an order with respect to the sensed actions. However, other priorities are possible. Also, it is envisioned that, other movements may be monitored by the converged communications device 30.

In addition to the voice communication discussed with FIG. 5 and FIG. 6, data communication may occur between the converged communications device 30 and the networks 15, 20, and 25. The data communication may be sent concurrently with the voice communication or in the background separate from the communication. The exemplary network selection algorithms of FIGS. 5 and 6 make operation decisions based on sensed actions. Alternatively, the converged communications device 30 may receive operation devices from the user via the user interface 55. Similar to voice communication, the converged communications device 30 may migrate between communication modalities over the networks 15, 20, and 25 for data communications based on the operation decisions by the user.

Figure 7:
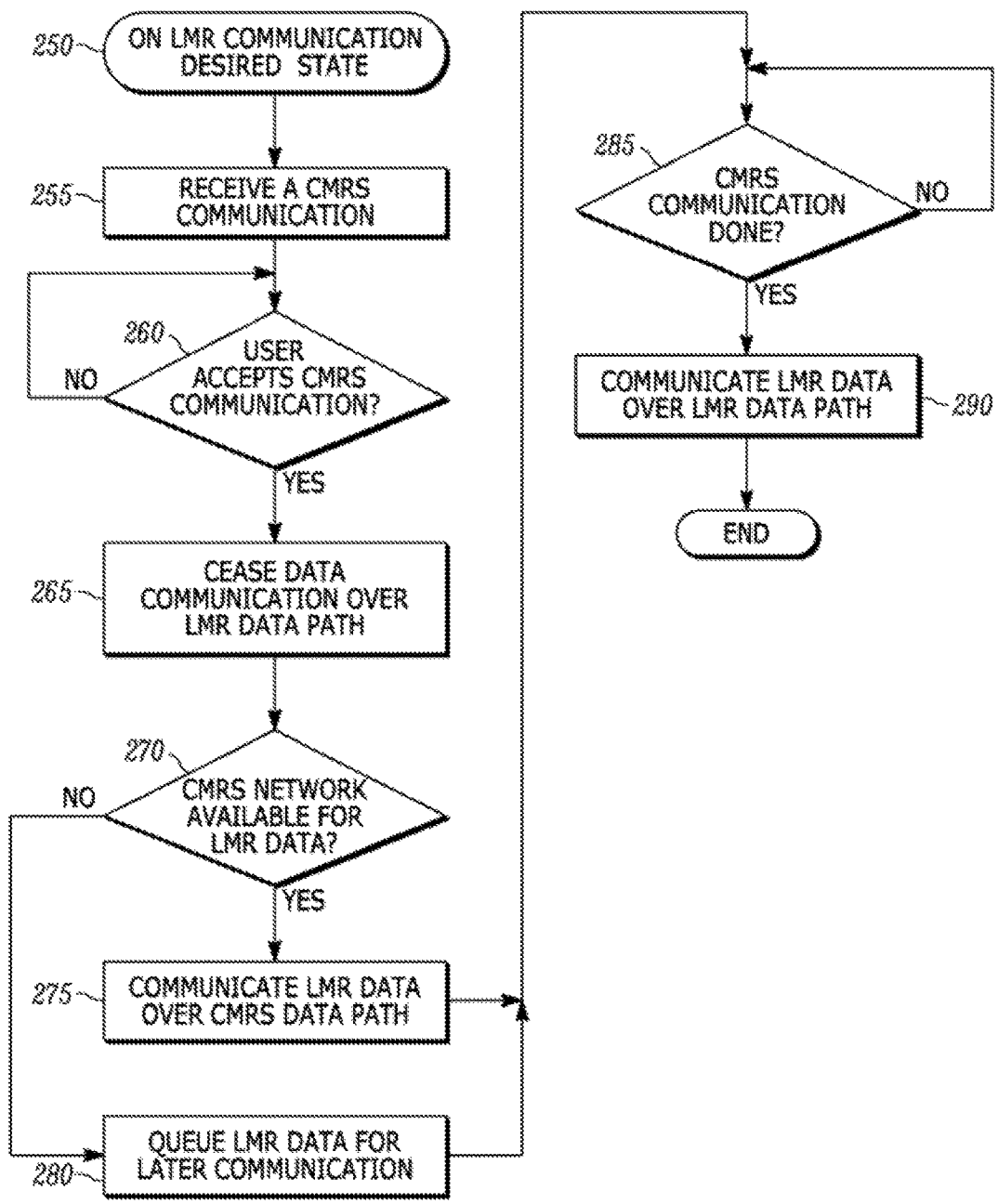
FIG. 7 is a flow chart illustrating the converged communications device of FIG. 2 transitioning from a first data path to a second data path.

FIG. 7 provides a procedure, according to one embodiment, of she converged communications device 30 transitioning from a first communication data path to a second communication data path. The procedure in FIG. 7 assumes that the converged communications device 30 is in a first communication state. For example, the first communication stare illustrated in FIG. 7 is the converged communications device 30 being in a land mobile radio communication state (block 250). The land mobile radio communication state communicates via a first communication modality. As already discussed, the user typically holds the converged communications device 30 in front of the user's face during the land mobile radio communication.

The converged communications device 30 receives a second communication The second communication may be in a second communication modality with a second network. For example, block 255 illustrates the converged communications device receiving a commercial mobile radio services (CMRS) communication, such as over the long term evolution network 20.

At block 260, the converged communications device 30 determines whether the user accepts the land mobile radio communication, i.e., the second communication. For example, the converged communications device 30 may accept the second communication in response to actions by the user, such as described with the procedure illustrated in FIG. 5. Alternatively, the user may accept the second communication using the user interface 55. While performing the loop of block 260, the converged communications device 30 may buffer a portion of the second communication. Also, the procedure includes a predefined time period for which to monitor for the action. Once the predefined time period has elapsed, the procedure may perform actions not illustrated in FIG. 7 and return to block 250. For example, one action may be the converged communications device 30 transitioning the second communication to a data storage for recording.

At block 265, the converged communications device 30 ceases communicating data over the land mobile radio network 15. More specifically, while the converged communications device 30 is in the land mobile radio communication state (block 250), the converged communications device 30 may be communicating data with the land mobile radio network 15. Some kinds of data typically communicated over the land mobile radio network 15 include global positioning system (GPS) data, Automatic Registration Service (ARS) data, over the air Rekey (OTAR) data, text message service (TMS) data, over the air programming (OTAP) data, and the like. The referenced data may be configured to go through a preferred network (for example, the land mobile radio network 15) even though another network (for example, the long term evolution network 20) may be available. Ceasing the data transmission via the land mobile radio network 15 may be necessary when the converged communications device is held in the first position 130 (FIG. 3).

Next, the converged communications device 30 determines whether the second network supports the converged communications device 30 communicating its data over the network. For the example in FIG. 7, the converged communications device 30 determines whether the long term evolution network 20 is available for receiving data normally communicated over the land mobile radio network 15 (block 270). If yes, then the converged communications device 30 communications the land mobile radio data over a long term evolution date path (block 275) of the long term evolution network 20. If no, then the converged communications device 30 queues the land mobile radio data for later communication (block 280).

At block 285, the converged communications device determines when the commercial mobile radio services communication is done. For example, the converged communications device 30 may determine that the second communication is complete by the gestures of the user, such as the gestures described with the procedure illustrated in FIG.

6. Alternatively, the user may end the second communication using the user interface 55, or the long term equivalent network 20 may terminate the second communication. When the second communication is complete, the converged communications device 30 communicates the land mobile radio data over a data path of the land mobile radio network 15 (block 290). More specifically, the converged communications device 30 reverts back to communicating over the land mobile radio network 15 when the procedure proceeds through block 275 or resumes communicating over the land mobile radio network 15 if the procedure proceeds through block 285.

The procedure disclosed and described with FIG. 7 has the first communication being associated with the land mobile radio network 15 and the second communication being associated with the long term evolution 20 network. Alternative communication modalities for the first and second communications are envisioned. For example, the first communication may be associated with the long term evolution 20 network and the second communication is associated with the land mobile radio network 15.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms and are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%. In another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more genetic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that bats no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code and data stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of controlling a converged communications device having a first speaker and a second speaker, the method comprising:

executing a first communication between the converged communications device and a first network using a first communication modality, the first communication modality being selected from the group consisting of a land mobile radio modality and a non-land mobile radio modality;

audibilizing the first communication with the first speaker;

receiving a second communication from a second network having a second communication modality different from the first communication modality, the second communication modality being selected from the group consisting of a land mobile radio modality and a non-land mobile radio modality;

detecting a predetermined movement of the converged communications device in response to receiving the second communication; and audibilizing the second communication with the second speaker based on the predetermined movement and based on the second communication modality, wherein detecting the predetermined movement includes at least one selected from the group consisting of detecting the predetermined movement of the converged communications device by a gyroscope and detecting a predetermined movement of the converged communications device by an accelerometer.

2. The method of claim 1, wherein the first speaker is a speaker selected from the group consisting of an earpiece speaker and a loudspeaker and the second speaker is the other of the earpiece speaker and the loudspeaker.

3. The method of claim 1, wherein the first communication modality is a non-land mobile radio modality and the audibilizing the first communication is with an earpiece speaker, and wherein the second communication modality is a land mobile radio modality and the audibilizing the second communication is with a loudspeaker.

4. The method of claim 1, wherein the first communication modality is a land mobile radio modality and the audibilizing the first communication is with a loudspeaker, and wherein the second communication modality is a non-land mobile radio modality and the audibilizing the second communication is with an earpiece speaker.

5. The method of claim 1, wherein the land mobile radio modality includes a half-duplex voice communication, and the non-land mobile radio modality includes a full-duplex voice communication.

6. The method of claim 1, wherein the land mobile radio modality includes a first defined frequency range, and the non-land mobile radio modality includes a second defined frequency range different from the first defined frequency range.

7. The method of claim 1, wherein the land mobile radio modality is communicated over a first communication network, and the non-land mobile radio modality is communicated over a second communication network different from the first communication network.

8. The method of claim 1, further comprising buffering a portion of the second communication upon receiving the second communication and before audibilizing the second communication.

9. The method of claim 1, further comprising generating an alert in response to receiving the second communication, and wherein sensing the action is in further response to generating the alert.

10. The method of claim 1, further comprising communicating data between the converged communications device and the first network using the first communication modality while executing the first communication between the converged communications device and the first network, and ceasing the communicating data between the converged communications device and the first network based on the action.

11. The method of claim 10, further comprising determining whether the second network supports communicating the data, and communicating the data between the converged communications device when the second network supports communicating the data.

12. The method of claim 11, wherein the first communication modality is a land mobile radio modality and the audibilizing the first communication is with a loudspeaker, and wherein the second communication modality is a non-land mobile radio modality and the audibilizing the second communication is with an earpiece speaker.

13. The method of claim 12, further comprising determining whether the second network supports communicating the data, and queuing the data when the second network does not support communicating the data.

14. The method of claim 1, further comprising suspending the first communication between the converged communications device and the first network based on the action, and buffering the first communication.

15. The method of claim 1, further comprising:
sensing an action on the converged communications device in response to receiving the second communication,
wherein sensing the action includes one or more of detecting an object near the converged communications device by a proximity sensor and detecting a facial feature near the converged communications device with a camera, and
wherein audibilizing the second communication with the second speaker is based further on the action.

16. A converged communications device comprising:
a first speaker;
a second speaker;
a first communication interface configured to communicate with a first network using a first communication modality, the first communication modality being selected from the group consisting of a land mobile radio modality and a non-land mobile radio modality;
a second communication interface configured to communicate with a second network using a second communication modality different from the first communication modality, the second communication modality selected from the group consisting of a land mobile radio modality and a non-land mobile radio modality; and
a processor coupled to the first speaker, the second speaker, the first communication interface, and the second communication interface, the processor being programmed to execute a first communication between the converged communications device and the first network using the first communication modality, cause the first speaker to audibilize the first communication based on the first communication modality, identify a second communication from the second network and having the second communication modality, detect a predetermined movement of the converged communications device in response to receiving the second communication, and cause the second speaker to audibilize the second communication based on the predetermined movement and based on the second communication modality.

17. The converged communications device of claim 16, further comprising a gyroscope, and wherein the processor detects the predetermined movement by being further programmed to detect the predetermined movement of the converged communications device with the gyroscope.

18. The converged communications device of claim 16, further comprising an accelerometer, and wherein the processor detects the predetermined movement by being further programmed to detect the predetermined movement of the converged communications device with the accelerometer.

19. The converged communications device of claim 16, further comprising a camera and wherein the processor is further programmed to detect a facial feature near the converged communications device with the camera, and
 cause the second speaker to audibilize the second communication further based on detecting the facial feature near the converged communications device.

20. The converged communications device of claim 16, further comprising a proximity sensor and wherein the processor is further programmed to detect an object near the converged communications device with the proximity sensor, and
 cause the second speaker to audibilize the second communication further based on detecting the object near the converged communications device.

21. The converged communications device of claim 16, further comprising a user interface for alerting the user of the second communication.

* * * * *